United States Patent
Duffy

(10) Patent No.: US 9,638,256 B2
(45) Date of Patent: May 2, 2017

(54) BEARING ASSEMBLY WITH LUBRICANT/COOLANT PASSAGES

(71) Applicant: United Technologies Corporation, Hartford, CT (US)

(72) Inventor: Kevin Duffy, Somers, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 14/775,297

(22) PCT Filed: Mar. 14, 2014

(86) PCT No.: PCT/US2014/027288
§ 371 (c)(1),
(2) Date: Sep. 11, 2015

(87) PCT Pub. No.: WO2014/152390
PCT Pub. Date: Sep. 25, 2014

(65) Prior Publication Data
US 2016/0047422 A1 Feb. 18, 2016

Related U.S. Application Data

(60) Provisional application No. 61/783,969, filed on Mar. 14, 2013.

(51) Int. Cl.
*F16C 37/00* (2006.01)
*F16C 33/66* (2006.01)
(Continued)

(52) U.S. Cl.
CPC .............. *F16C 37/007* (2013.01); *F02C 7/06* (2013.01); *F16C 33/586* (2013.01);
(Continued)

(58) Field of Classification Search
CPC ...... F16C 37/00; F16C 37/007; F16C 33/667; F16C 33/6659; F16C 33/6681;
(Continued)

(56) References Cited

U.S. PATENT DOCUMENTS 3,706,483 A * 12/1972 Irwin ..................... F16C 33/588
384/448
5,106,209 A 4/1992 Atkinson et al.
(Continued)

FOREIGN PATENT DOCUMENTS

| JP | 2006316846 | 11/2006 |
| WO | 2011156139 | 12/2011 |

*Primary Examiner* — Alan B Waits
(74) *Attorney, Agent, or Firm* — O'Shea Getz P.C.

(57) ABSTRACT

A bearing assembly for mounting relative to a housing is provided that includes a bearing ring, a plurality of rotational members, and a bearing ring baffle. The bearing ring has a housing surface, an inner radial surface, a first axial end, a second axial end, and a plurality of channels disposed in the first axial end of the ring. The bearing ring baffle has a housing surface, an inner radial surface, a first axial end, a second axial end, and a plurality of fins extending out from the second axial end of the baffle. The fins and channels are configured to mate with one another and to create at least one passage there between, and the passage is con figured for the passage of lubricant there through.

20 Claims, 2 Drawing Sheets

(51) Int. Cl.
*F16C 19/06* (2006.01)
*F02C 7/06* (2006.01)
*F16C 33/58* (2006.01)
*F01D 25/16* (2006.01)

(52) U.S. Cl.
CPC ...... *F16C 33/6659* (2013.01); *F16C 33/6681* (2013.01); *F01D 25/164* (2013.01); *F16C 19/06* (2013.01)

(58) Field of Classification Search
CPC  F16C 33/586; F16C 33/6637; F16C 33/6651; F16C 19/06; F02C 7/06
See application file for complete search history.

(56) References Cited

U.S. PATENT DOCUMENTS

| | | | | |
|---|---|---|---|---|
| 5,744,880 | A * | 4/1998 | Kudoh | H02K 5/20 310/58 |
| 5,856,992 | A * | 1/1999 | Karube | F04D 29/102 372/58 |
| 8,562,224 | B2 * | 10/2013 | Duffy | F16C 33/6677 384/475 |
| 9,068,593 | B2 * | 6/2015 | Gloeckner | F16C 27/045 |
| 9,234,548 | B2 * | 1/2016 | Frank | F16C 33/58 |
| 9,366,295 | B2 * | 6/2016 | Sebald | F16C 37/002 |
| 2004/0080113 | A1 | 4/2004 | Linden et al. | |
| 2011/0142386 | A1 | 6/2011 | Flouros | |
| 2011/0268381 | A1 * | 11/2011 | Hamada | F16C 19/52 384/569 |

\* cited by examiner

BEARING ASSEMBLY WITH LUBRICANT/COOLANT PASSAGES

This application claims priority to PCT Patent Appln. No. PCT/US 14/27288 filed Mar. 14, 2014, which claims priority to U.S. Provisional Patent Appln. No. 61/783,969 filed Mar. 14, 2013, which are hereby incorporated herein by reference in their entireties.

BACKGROUND OF THE INVENTION

1. Technical Field

This disclosure relates generally to gas turbine engines and, more particularly, to a bearing assembly for reducing heat generation and associated power loss therein.

2. Background Information

Modern gas turbine engines demand ever higher performance from bearings. Current engine architectures require relatively high lubricant flow rates to maintain bearings below their operational temperature limits. However, the cooling effectiveness of lubricant flow is reduced at higher flow rates due in part to lubricant churning within the bearing cavity. It would, therefore, be useful to provide a bearing assembly configuration with enhanced cooling and lubrication that satisfies the bearing's needs with decreased churning and power loss associated therewith.

SUMMARY OF THE DISCLOSURE

According to an aspect of the present invention, a bearing assembly for mounting relative to a housing is provided. The bearing assembly includes a bearing ring, a plurality of rotational members, and a bearing ring baffle. The bearing ring has a housing surface, an inner radial surface, a first axial end, a second axial end, and a plurality of channels disposed in the first axial end of the ring. The bearing ring baffle has a housing surface, an inner radial surface, a first axial end, a second axial end, and a plurality of fins extending out from the second axial end of the baffle. The fins and channels are configured to mate with one another and to create at least one passage there between, and the passage is configured for the passage of lubricant there through.

According to another aspect of the present invention, a bearing assembly for mounting relative to a housing is provided. The bearing assembly includes a bearing ring, a plurality of rotational members, and a bearing ring baffle. The bearing ring has a housing surface, an inner radial surface, a first axial end, a second axial end, and a plurality of channels extending out from the first axial end of the ring. The bearing ring baffle has a housing surface, an inner radial surface, a first axial end, a second axial end, and a plurality of fins disposed in the second axial end of the baffle. The fins and channels are configured to mate with one another and to create at least one passage there between, and the passage is configured for the passage of lubricant there through.

According to another aspect of the present invention, a bearing assembly is provided that includes a bearing ring, a plurality of rotational members, a bearing ring baffle, and a housing. The bearing ring has a housing surface, an inner radial surface, a first axial end, a second axial end, and a plurality of channels disposed in the first axial end of the ring. The bearing ring baffle has a housing surface, an inner radial surface, a first axial end, a second axial end, and a plurality of fins extending out from the second axial end of the baffle. The housing has one or more lubricant passages aligned with at least one of the channels disposed in the first axial end of the bearing ring. The fins and channels are configured to mate with one another and to create at least one passage there between extending along the first axial end of the bearing ring, and the passage is configured for the passage of lubricant there through.

According to another aspect of the present invention a bearing assembly is provided that includes a bearing ring, a plurality of rotational members, a bearing ring baffle, and a housing. The bearing ring has a housing surface, an inner radial surface, a first axial end, a second axial end, a plurality of channels disposed in the first axial end of the ring, a plurality of channels disposed in the second axial end of the ring, and one or more axially extending channels disposed in the housing surface extending between the channels disposed in the first and second axial ends. The bearing ring baffle has a housing surface, an inner radial surface, a first axial end, a second axial end, a plurality of fins extending out from the second axial end of the baffle, and one or more flow apertures extending between the housing and inner radial surfaces of the baffle. The housing has one or more lubricant passages aligned with the flow apertures disposed in the bearing ring baffle, and a plurality of fins extending out from a surface adjacent the second axial end of the bearing ring. The fins of the bearing ring baffle and the channels of the first axial end are configured to mate with one another and to create at least one passage there between extending along the first axial end of the bearing ring, and the fins of the housing and the channels of the second axial end are configured to mate with one another and to create at least one passage there between extending along the second axial end of the bearing ring. The axially extending channels provide fluid communication between the passage extending along the first axial end of the bearing ring, and the passage extending along the second axial end of the bearing ring.

In an embodiment of the foregoing aspects, the bearing ring and the bearing ring baffle are circumferentially extending rings.

In another embodiment of the foregoing aspects, or in addition to other embodiments, the fins and channels extend around the circumference of the bearing ring baffle and the bearing ring, and the housing in some embodiments.

In another embodiment of the foregoing aspects, or in addition to other embodiments, at least one passages includes a plurality of passages, circumferentially spaced apart from one another around a circumference of the bearing assembly.

The present invention is described herein in terms of aspects and embodiments of those aspects that include elements or features that may be included with the aspects. The identified embodiments may be included with the aspect of the invention singularly or in combination with any of the other identified embodiments as will be described herein below in the Detailed Description. The features and advantages of the present invention will become apparent in light of the detailed description of the invention provided below, and as illustrated in the accompanying drawings.

DETAILED DESCRIPTION OF THE INVENTION

Figure 1:
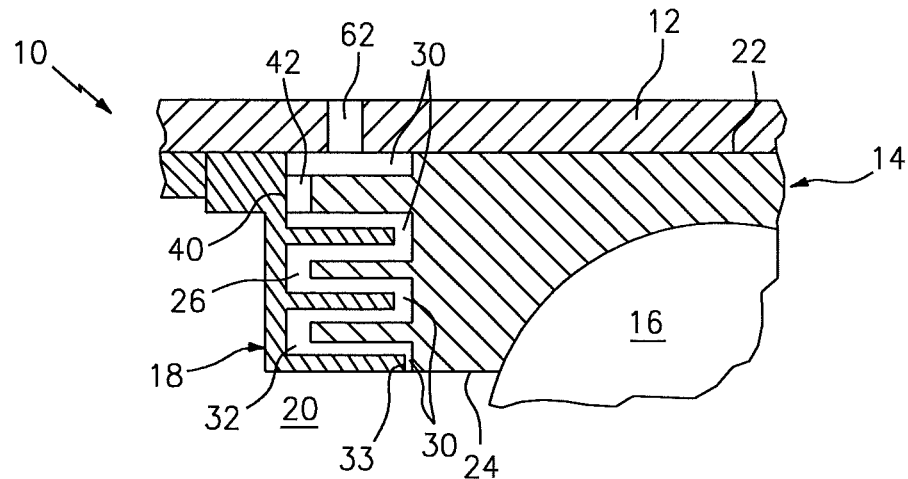
FIG. 1 is a diagrammatic cross-section of a first embodiment of a bearing assembly.

Referring to FIG. 1, a bearing assembly 10 disposed relative to a housing 12 includes a bearing ring 14, a plurality of rotational members 16, and a bearing ring baffle 18. The housing 12 is disposed radially outside of the bearing ring 14. The region radially inside of the bearing ring 14 is referred to as the bearing cavity 20. The embodiments shown in FIGS. 1-5 are circumferential bearing assemblies.

As shown in FIGS. 1-5, the rotational members 16 are spherical ball bearings. The invention is not limited to bearing assemblies using spherical ball bearings, however. In other embodiments, the rotational members 16 can assume different configurations; e.g., roller bearings. To facilitate the description of the present invention, however, embodiments of the present bearing assembly 10 will be described in terms of ball bearings with spherical rolling elements. The present bearing assembly 10 is not limited to any particular rotational member configuration.

In the embodiments shown in FIGS. 1-6, a single bearing ring 14 is shown (e.g., an outer circumferential ring) which is configured to mate with a spherical ball bearing 16. As indicated above, rotational members other than spherical ball bearings may be used. Consequently, the bearing ring 14 that mates with the rotational members 16 are not limited to use with spherical ball bearings. In most embodiments the bearing assembly 10 includes a second bearing ring; e.g., an inner circumferential bearing ring (not shown). The second bearing ring may be configured the same as, similar to, or different than any of the bearing ring 14 embodiments described herein.

The bearing ring 14 includes a housing surface 22, an inner radial surface 24, a first axial end 26, and a second axial end 28. In the embodiments shown in FIGS. 1-6, the bearing ring 14 includes a plurality of channels 30 disposed in the first axial end 26 that form at least a portion of one or more lubricant passages 32 in combination with the bearing ring baffle 18 as will be described below. The tem). "lubricant" is used herein to refer to a fluid that provides lubrication to the bearing 10, or acts as a coolant to the bearing 10, or in most instances acts as both a lubricant and coolant. Any fluid, that is, any gas or liquid, can be used as a lubricant in the bearing assembly. For ease of description, the fluid will be referred to hereinafter as a "lubricant". Lubricants are well known in the art, and the application at hand for the bearing assembly 10 will influence the specific lubricant to be used. The present bearing assembly 10 is not limited to any particular lubricant.

Figure 2:
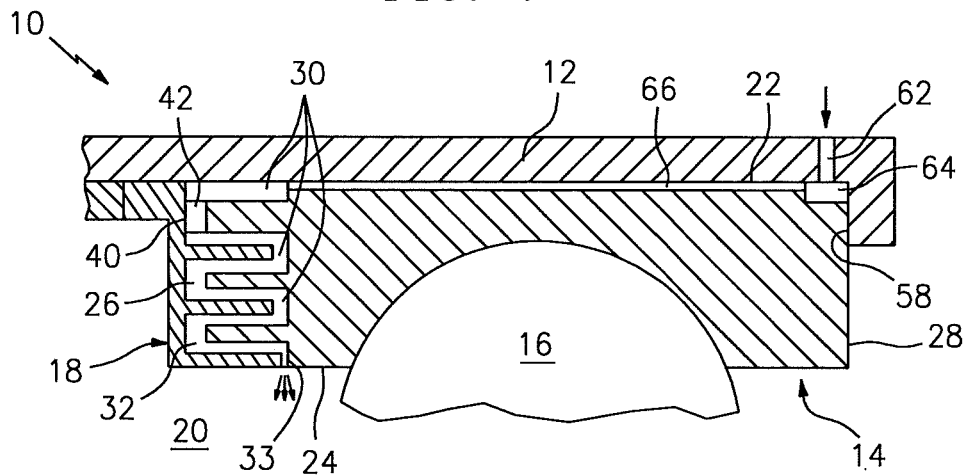
FIG. 2 is a diagrammatic cross-section of a second embodiment of a bearing assembly.
Figure 6:
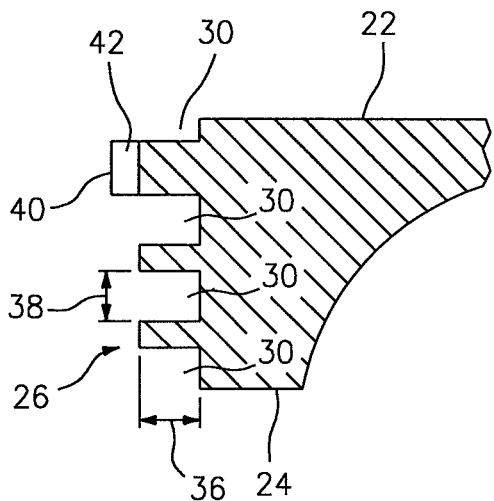
FIG. 6 is a diagrammatic partial cross-section of a bearing ring.
Figure 3:
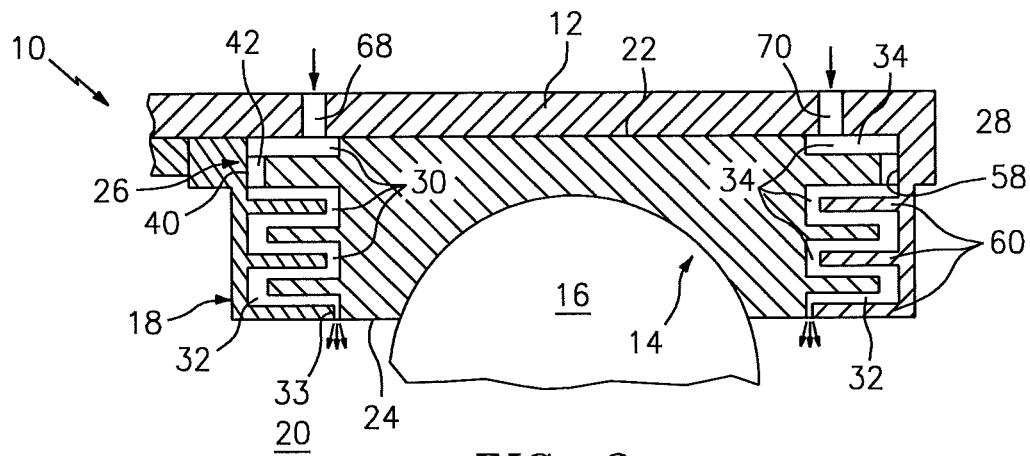
FIG. 3 is a diagrammatic cross-section of a third embodiment of a bearing assembly.

In the embodiments shown in FIGS. 3 and 5, the bearing ring 14 includes a plurality of channels 34 disposed in the second axial end 28 that form at least a portion of one or more lubricant passages 32 as will be described below. The bearing ring material disposed between channels may also be considered to be "fins", but to avoid confusion the description will refer to the channels with respect to the bearing ring 14. As the embodiments described below will illustrate, the bearing ring 14 may include only the channels 30 disposed in the first axial end 26, only the channels 34 disposed in the second axial end 28, or channels in both axial ends. The number of channels 30, 34, and the depth 36 and width 38 of each channel 30, 34 (see FIG. 6) are selected to suit the application at hand. In the embodiments shown in FIGS. 1-5, each channel 30 is shown having a depth 36 and a width 38 (see FIG. 6) that is substantially equal to those of the other channels. In alternative embodiments, the depth and width of any channel 30, 34 may be different from that of another channel 30, 34. As shown in FIGS. 1-5, the housing surface 22 forms at least part of the outer radial surface of the bearing ring 14. In the embodiments shown in FIGS. 1-5, the bearing ring 14 is shown as a unitary circumferentially extending ring-like structure. In alternative embodiments, the bearing ring 14 may include a plurality of portions; e.g., a first and second axial portions independent from one another that may be separated from one another by shims, etc. The material of the bearing ring 14 is selected based on the application at hand and is not limited to any particular material.

In the embodiments shown in FIGS. 1-5, for example, the first axial end material 40 between at least one pair of channels 30 extends out from the inner radial surface 24 of the bearing ring 14 a distance sufficient to contact the bearing ring baffle 18. A plurality of circumferentially spaced apart notches 42 cut into the material 40 allows for the passage of lubricant. The "longer" material 40 between channels 30 (shown in FIGS. 1-5 as between the radially outermost channels) allow the axial force of the bearing stack to be transferred from the bearing ring baffle 18 to the bearing ring 14. The present bearing assembly 10 is not limited to providing the contact with the bearing ring baffle 18 in any particular configuration when the bearing assembly 10 is assembled.

Figure 7:
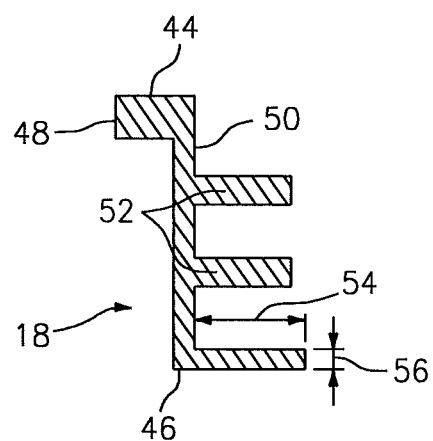
FIG. 7 is a diagrammatic partial cross-section of a bearing ring baffle.

The bearing ring baffle 18 is a circumferentially extending ring-like structure that is configured to engage the inner radial surface 24 of the bearing ring 14. Referring to FIG. 7, the bearing ring baffle 18 includes a housing surface 44, an inner radial surface 46, a first axial end 48, and a second axial end 50. In the embodiments shown in FIGS. 1-5 and 7, the bearing ring baffle 18 includes a plurality of fins 52 outwardly extending in an axial direction from the second axial end 50, which fins 52 define at least a portion of one or more lubricant passages 32 in combination with the channels 30 disposed in the inner radial surface 24 of the bearing ring 14. As suggested above, the bearing ring baffle 18 could alternatively be described as having "channels" disposed in the second axial end, but to avoid confusion the description will refer to the baffle as having "fins". The number of fins 52, and the length 54 and width 56 of each fin 52 are selected to suit the application at hand in cooperation with the bearing ring 14 as described below. In some embodiments, each fin 52 is shown having a length 54 and a width 56 that is substantially equal to those of the other fins 52. In alternative embodiments, the length 54 and width 56 of any fin 52 may be different from that of another fin 52.

The bearing ring baffle 18 can be used to maintain the bearing assembly 10 at a particular axial position as part of a bearing stack; e.g., an axial retention device (not shown) can be used to apply an axial direction force through the bearing ring baffle 18 to the bearing assembly 10. As indicated above, material 40 disposed between channels 30 disposed in the first axial end 26 of the bearing ring 14 are configured to contact the bearing ring baffle 18. The material 40 allows the axial force of the bearing stack to be transferred from the bearing ring baffle 18 to the bearing ring 14. In FIG. 2, the second axial surface 28 of the bearing ring 14 is disposed in contact with a shoulder 58 extending radially out from the housing 12. In such an embodiment, an axial force applied to the bearing ring baffle 18 maintains the bearing ring 14 between the bearing ring baffle 18 and the housing shoulder 58.

The mating male and female portions of the bearing ring baffle 18 and the bearing ring 14 (i.e., the fins and the channels, respectively) are sized such that passages 32 are formed there between of sufficient size to allow for the passage of lubricant. Specifically, the width 56 of each fin 52 is less than the width 38 of the mating channel 30, and the length 54 of each fin 52 is less than the depth 36 of each mating channel 30. In those embodiments where the depth and width of a fin differs from that of another fin, the corresponding channel is sized to mate with the respective fin to create the aforesaid passage 32. The radial and circumferential positioning of the fins 52 and channels 30 are aligned with one another.

In some embodiments the fin length and channel depth of one or more mating fin and channel may be configured to form a smaller cross-sectional area passage 33 there between; e.g., to form a flow restriction 33. For example, in FIGS. 1-5 the depth 36 of the radially innermost channel 30 disposed in the inner radial surface 24 of the bearing ring 14 is the same as the depth 36 of the other channels. The length 54 of the mating radially innermost fin 52, however is longer than the length 54 of the other fins 52. As a result, the cross-sectional area of the passage 33 between the end of the aforesaid fin 52 and the base of the aforesaid channel 30 is less than the cross-sectional area of the rest of the passage 32, thereby creating a flow restriction 33. The flow restriction 33 can be sized to help maintain the passage 32 along the inner radial surface 24 of the bearing ring 14 filled with lubricant. In the embodiments shown in FIGS. 1-3, the passage 33 formed between the end of the radially innermost fin 52 and the base of the radially innermost channel 30 provides a circumferentially extending slot through which lubricant exits the passage 33. In some embodiments, portions of the radially innermost fin 52 may contact the channel base at circumferential positions, thereby providing discrete circumferentially located exit apertures rather than a single slot. The size of these apertures may be chosen to create flow restrictions.

The passages 32 formed between the fins 52 and the channels 30 may extend around the entire circumference of the respective bearing ring 14 and bearing ring baffle 18. Alternatively, one or more passages 32 may be formed at different circumferential positions; i.e., discrete circumferentially located passages 32.

As indicated above, in FIGS. 3 and 5 the second axial face 28 of the bearing ring 14 includes a plurality of channels 34. In these embodiments, the housing 12 is shown as having a plurality of fins 60 outwardly extending in an axial direction, which fins 60 define at least a portion of one or more lubricant passages 32 in combination with the channels 34 disposed in the second axial end 28 of the bearing ring 14. The housing fins 60 and second axial face channels 34 can be configured as described above with respect to the bearing ring baffle 18 and the first axial face of the bearing ring 14. In alternative embodiments, the fins 60 described as extending out from the housing 12 may be part of a separate element disposed between the housing 12 and the bearing ring 14.

Embodiments of the bearing assembly 10 are described above as having channels (female components) disposed in the axial end surfaces of the bearing ring 14, and the bearing ring baffle 18 and housing 12 are described as having mating fins (male components). The aforesaid male and female components may alternatively be reversed such that the male components extend out from the bearing ring 14 and the female components are disposed in the bearing ring baffle 18 and housing 12, or some combination thereof.

In the embodiment shown FIG. 1, the housing 12 includes one or more lubricant passages 62 axially and circumferentially aligned with a channel 30 disposed in the inner radial surface 24 of the bearing ring 14. In this embodiment, lubricant flow may travel from a region radially outside of the housing 12, through the housing 12 into the passage 32 disposed along the first axial surface 26 of the bearing ring 14, through that passage 32, and exit out the passage 32 at the inner radial surface 24 of the bearing ring 14 and into the bearing cavity 20. This embodiment permits lubricant flow, and consequent heat transfer from the bearing ring 14 to the lubricant along the entire first axial end 26 of the bearing ring 14.

In the embodiment shown FIG. 2, the housing 12 includes one or more lubricant passages 62 axially and circumferentially aligned with an aft channel 64 disposed adjacent the second axial end 28 of the bearing ring 14. In this embodiment, one or more axially extending channels 66 are disposed in the housing surface 22 of the bearing ring 14, extending between the aft channel 64 and the channels 30 disposed in the first axial end of the bearing ring 14. The one or more axially extending channels 66 create a fluid communication path from the lubricant passage 62 in the housing 12, and the aft channel 64 to the channels 30 in the first axial end of the bearing ring 14. The axially extending channels 66 may alternatively be disposed in the housing 12, or formed partially in the housing 12 and in the bearing ring 14. In this embodiment, lubricant may pass through the housing 12, into the aft channel 64, then through the axially extending channels 66 and into the passage 32 disposed at the first axial end 26 of the bearing ring 14, through that passage 32, and exit at the inner radial surface 24 of the bearing ring 14 and into the bearing cavity 20. This embodiment permits lubricant flow, and consequent heat transfer from the bearing ring 14 to the lubricant, at a portion of the second axial end 28 of the bearing ring 14, along the housing surface 22, and along the entire first axial end 26 of the bearing ring 14.

In the embodiment shown in FIG. 3, one or more first lubricant passages 68 in the housing are disposed axially and circumferentially aligned with a channel 30 disposed in the first axial end 26 of the bearing ring 14, and one or more second lubricant passages 70 in the housing are disposed axially and circumferentially aligned with a channel 34 disposed in the second axial end 28 of the bearing ring 14. In this embodiment, lubricant may pass through the first and second lubricant passages 68, 70 disposed in the housing 12 into the passages 32 disposed at the first and second axial ends 26, 28 of the bearing ring 14, respectively, and exit out those passages at the inner radial surface 24 of the bearing ring 14 and into the bearing cavity 20. This embodiment permits lubricant flow, and consequent heat transfer from the bearing ring 14 to the lubricant, along the entire first axial end 26 of the bearing ring 14 and along the entire second axial end 28 of the bearing ring 14.

Figure 4:
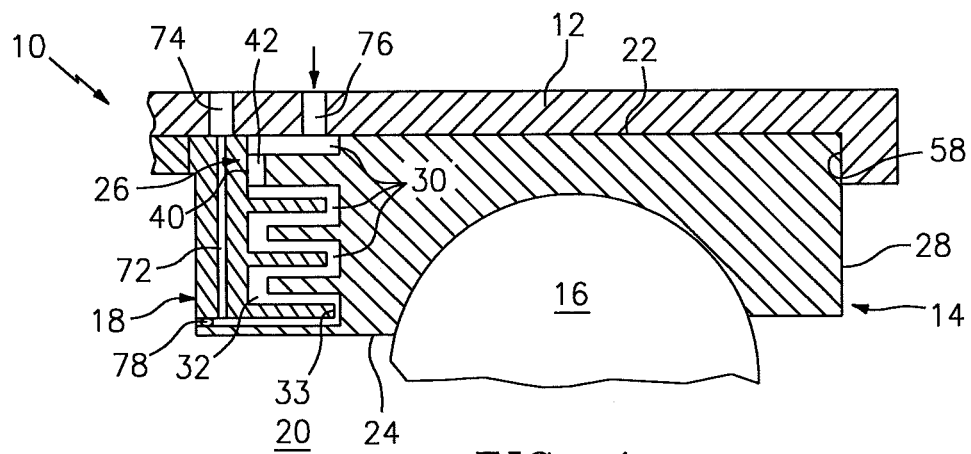
FIG. 4 is a diagrammatic cross-section of a fourth embodiment of a bearing assembly.
Figure 5:
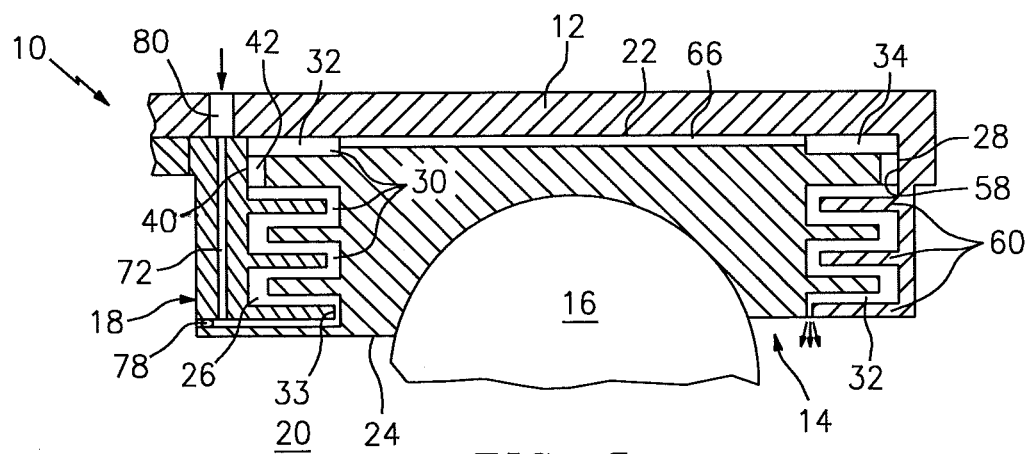
FIG. 5 is a diagrammatic cross-section of a fifth embodiment of a bearing assembly.

In the embodiment shown in FIG. 4: a) the bearing ring baffle 18 includes one or more flow apertures 72 extending radially between the housing surface 44 and the inner radial surface 46 of the bearing ring baffle 18; b) the housing 12 includes one or more first lubrication apertures 74 aligned with the flow apertures 72 disposed in the baffle 18, and one or more second lubrication apertures 76 aligned with a channel 30 disposed in the first axial end 26 of the bearing ring 14; and c) a seal 78 disposed between the inner radial surface 46 of the baffle and a surface of the radially innermost channel 30 disposed in the first axial end 26 of the bearing ring 14. In this embodiment, lubricant may travel from the region radially outside of the housing 12, through the second lubrication apertures 76 in the housing 12 and into the passage 32 extending along the first axial end 26 of the bearing ring 14, and return to the region radially outside of the housing 12 via the flow apertures 72 disposed in the baffle 18, or vice versa. The seal 78 prevents lubricant leakage between the inner radial surface 46 of the baffle 18 and a surface of the radially innermost channel 30 disposed in the first axial end 26 of the bearing ring 14. This embodiment permits lubricant flow, and consequent heat transfer from the bearing ring 14 to the lubricant, along the entire first axial end 26 of the bearing ring 14, and the return of lubricant to the region disposed radially outside of the housing 12.

In the embodiment shown in FIG. 5, the housing 12 includes one or more lubricant passages 80 axially and circumferentially aligned with one or more flow apertures 72 disposed in the bearing ring baffle 18. The flow apertures 72 extend radially between the housing surface 44 and the inner radial surface 46 of the bearing ring baffle 18. This embodiment also includes: a) a passage 32 disposed along the second axial end 28 of the bearing ring 14 as described above; b) one or more axially extending channels 66 disposed in the housing surface 22 of the bearing ring 14 (or disposed in the housing 12, or some combination thereof), extending between the passage 32 disposed along the first axial end 26 of the bearing ring 14 and the passage 34 disposed along the second axial end 28 of the bearing ring 14; and c) a seal 78 disposed between the inner radial surface 46 of the baffle 18 and a surface of the radially innermost channel 30 disposed in the first axial end 26 of the bearing ring 14. In this embodiment, lubricant flow may pass through the housing 12 and into the bearing ring baffle 18, into the passage 32 at the first axial end 26 of the bearing ring 14, through the axially extending channels 66, into and through the passage 32 disposed at the second axial end 28 of the bearing ring 14, and exit out the inner radial surface 24 of the bearing ring 14 and into the bearing cavity 20. This embodiment permits lubricant flow, and consequent heat transfer from the bearing ring 14 to the lubricant, along the entire first axial end 26 of the bearing ring 14, along the housing surface 22, and along the entire second axial end 28 of the bearing ring 14.

As indicated above, most embodiments of the bearing assembly 10 include an inner circumferential bearing ring, which bearing ring may include passages to allow lubricant to enter into the bearing cavity 20 for lubricating and cooling the bearing. Prior art bearing assemblies that provide lubricant into the bearing cavity 20 only through the inner circumferential ring require a substantial flow volume of lubricant within the bearing cavity 20 to accomplish the requisite lubrication and cooling. There is a power loss associated with the lubricant residing within the bearing cavity, of which a very high percentage (e.g., 90% or greater) is attributable to the lubricant churning within the bearing cavity 20. The present bearing assembly 10 facilitates cooling the bearing assembly 10, and in particular the outer circumferential ring 14 of the bearing assembly 10. As a result, it is possible to cool and lubricate the bearing with less lubricant, which decreased volume also decreases the concomitant churning and power loss. Consequently, the present bearing assembly 10 makes it possible to operate the bearing assembly 10 at greater speeds and loads at lower temperatures. In addition, the present bearing assembly 10 provides advantageous cooling without creating appreciable stress concentrations within the bearing ring 14.

While the invention has been described with reference to exemplary embodiments, it will be understood by those skilled in the art that various changes may be made and equivalents may be substituted for elements thereof without departing from the scope of the inventions. Modifications may be made to adapt a particular or material to the teachings of the invention without departing from the essential scope thereof. Therefore it is intended that the invention not be limited to the particular embodiments falling within the scope of the appended claims.

What is claimed is:

1. A bearing assembly for mounting relative to a housing, comprising:
 a bearing ring having a housing surface, an inner radial surface, a first axial end, a second axial end, and a plurality of channels disposed in the first axial end of the ring;
 a plurality of rotational members; and
 a bearing ring baffle having a housing surface, an inner radial surface, a first axial end, a second axial end, and a plurality of fins extending out from the second axial end of the baffle;
 wherein the fins and channels are configured to mate with one another and to create at least one passage there between;
 wherein the passage is configured for the passage of lubricant there through; and
 wherein a radially innermost fin and a radially innermost channel are configured to form one or more exit apertures in fluid communication with a bearing compartment.

2. The bearing assembly of claim 1, wherein the one or more exit apertures are configured to create a flow restriction relative to the passage.

3. The bearing assembly of claim 1, wherein the bearing ring and the bearing ring baffle are circumferentially extending rings.

4. The bearing assembly of claim 3, wherein the fins and channels extend around the circumference of the bearing ring baffle and the bearing ring, respectively.

5. The bearing assembly of claim 1, wherein each fin has a width and a length, and each channel has a width and a depth, and wherein the length of at least some of the fins is less than the depth of the channel with which the fin mates.

6. The bearing assembly of claim 5, wherein a portion of at least a plurality of the fins have a length that is equal to or greater than the depth of the channel with which they mate, which portions contact the second axial surface of the bearing ring baffle.

7. The bearing assembly of claim 5, wherein the width of each fin is less than the width of the channel with which the fin mates.

8. The bearing of claim 1, wherein bearing ring includes a plurality of channels disposed in the second axial end of the ring.

9. A bearing assembly for mounting relative to a housing, comprising:
 a bearing ring having a housing surface, an inner radial surface, a first axial end, a second axial end, and a plurality of channels disposed in the first axial end of the ring;
 a plurality of rotational members; and a bearing ring baffle having a housing surface, an inner radial surface, a first axial end, a second axial end, and a plurality of fins extending out from the second axial end of the baffle;

wherein the fins and channels are configured to mate with one another and to create at least one passage there between;

wherein the passage is configured for the passage of lubricant there through; and wherein the at least one passage includes a plurality of passages, circumferentially spaced apart from one another around a circumference of the bearing assembly.

10. A bearing assembly, comprising:

a bearing ring having a housing surface, an inner radial surface, a first axial end, a second axial end, and a plurality of channels disposed in the first axial end of the ring;

a plurality of rotational members; and a bearing ring baffle having a housing surface, an inner radial surface, a first axial end, a second axial end, and a plurality of fins extending out from the second axial end of the baffle; and a housing having one or more lubricant passages aligned with at least one of the channels disposed in the first axial end of the bearing ring;

wherein the fins and channels are configured to mate with one another and to create at least one passage there between extending along the first axial end of the bearing ring; and wherein the passage is configured for the passage of lubricant there through.

11. The bearing assembly of claim 10, wherein the bearing ring includes an aft channel positioned to align with the lubricant passages in the housing, and one or more axially extending channels disposed in the housing surface, which axially extending channels provide fluid communication between the aft channel and the passage disposed along first axial end of the bearing ring.

12. The bearing assembly of claim 10, wherein the bearing ring includes an aft channel positioned to align with the lubricant passages in the housing, and the housing includes one or more axially extending channels, which axially extending channels provide fluid communication between the aft channel and the passage disposed along first axial end of the bearing ring.

13. The bearing assembly of claim 10, wherein the bearing ring includes a plurality of channels disposed in the second axial end of the ring; and the housing includes a plurality of fins extending out from a surface adjacent the second axial end of the bearing ring, and one or more lubricant passages aligned with at least one of the channels disposed in the second axial end of the bearing ring;

wherein the housing fins and channels in the second axial end are configured to mate with one another and to create at least one passage there between extending along the second axial end of the bearing ring.

14. The bearing assembly of claim 13, wherein a radially innermost housing fin and a radially innermost second axial end channel are configured to form one or more exit apertures in fluid communication with a bearing compartment.

15. The bearing assembly of claim 14, wherein the one or more exit apertures are configured to create a flow restriction relative to the passage extending along the second axial end of the bearing ring.

16. The bearing assembly of claim 10, wherein the bearing ring baffle includes one or more flow apertures extending between the housing and inner radial surfaces of the baffle, and the housing includes one or more second apertures aligned with the flow apertures disposed in the baffle; and a seal disposed between the inner radial surface of the baffle and a surface of the radially innermost channel disposed in the first axial end of the bearing ring.

17. The bearing assembly of claim 10, wherein the bearing ring and the bearing ring baffle are circumferentially extending rings.

18. The bearing assembly of claim 17, wherein the fins and the channels extend around the circumference of the bearing ring baffle and the bearing ring, respectively.

19. The bearing assembly of claim 10, wherein the at least one passages includes a plurality of passages, circumferentially spaced apart from one another around a circumference of the bearing assembly.

20. A bearing assembly, comprising:

a bearing ring having a housing surface, an inner radial surface, a first axial end, a second axial end, a plurality of channels disposed in the first axial end of the ring, a plurality of channels disposed in the second axial end of the ring, and one or more axially extending channels disposed in the housing surface extending between the channels disposed in the first and second axial ends;

a plurality of rotational members; and a bearing ring baffle having a housing surface, an inner radial surface, a first axial end, a second axial end, a plurality of fins extending out from the second axial end of the baffle, and one or more flow apertures extending between the housing and inner radial surfaces of the baffle; and a housing having one or more lubricant passages aligned with the flow apertures disposed in the bearing ring baffle, and a plurality of fins extending out from a surface adjacent the second axial end of the bearing ring;

wherein the fins of the bearing ring baffle and the channels of the first axial end are configured to mate with one another and to create at least one passage there between extending along the first axial end of the bearing ring, and the fins of the housing and the channels of the second axial end are configured to mate with one another and to create at least one passage there between extending along the second axial end of the bearing ring; and wherein the axially extending channels provide fluid communication between the passage extending along the first axial end of the bearing ring, and the passage extending along the second axial end of the bearing ring.

* * * * *